US012752729B2

(12) United States Patent
Faruque et al.

(10) Patent No.: US 12,752,729 B2
(45) **Date of Patent: *Oct. 6, 2026**

(54) RELEASEABLE SPRING-LOADED BUMPER ASSEMBLY

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 296 days.

This patent is subject to a terminal disclaimer.

(21) Appl. No.: 18/439,808

(22) Filed: Feb. 13, 2024

(65) Prior Publication Data

US 2025/0256671 A1 Aug. 14, 2025

(51) Int. Cl.

*B60R 19/36* (2006.01)
*B60R 19/28* (2006.01)
*B60R 19/34* (2006.01)

(52) U.S. Cl.

CPC .............. *B60R 19/36* (2013.01); *B60R 19/28* (2013.01); *B60R 19/34* (2013.01)

(58) Field of Classification Search

CPC ......... B60R 19/36; B60R 19/28; B60R 19/34; B60R 19/12
USPC ......................................... 293/132, 135, 137
See application file for complete search history.

(56) References Cited

U.S. PATENT DOCUMENTS

| | | | |
|---|---|---|---|
| 2,094,739 | A | 10/1937 | Geiger |
| 2,142,328 | A | 1/1939 | Mutter |
| 3,756,643 | A | 9/1973 | Weed |
| 5,029,919 | A | 7/1991 | Bauer |
| 6,050,624 | A | 4/2000 | Kim |
| 6,393,999 | B1 | 5/2002 | Schneider |
| 6,871,889 | B2 | 3/2005 | Ericsson |
| 6,976,718 | B2 | 12/2005 | Nakanishi |
| 8,113,555 | B2 | 2/2012 | Faruque |
| 8,246,091 | B1 | 8/2012 | Jayasuriya et al. |
| 8,544,905 | B2 | 10/2013 | Handing et al. |
| 9,067,552 | B1 | 6/2015 | Cheng et al. |
| 9,227,585 | B1 | 1/2016 | Barbat et al. |

(Continued)

FOREIGN PATENT DOCUMENTS

| | | |
|---|---|---|
| CN | 209479608 U | 10/2019 |
| CN | 112455373 A | 3/2021 |

(Continued)

OTHER PUBLICATIONS

Non-Final Office Action dated Oct. 1, 2025.
Non-Final Office Action for U.S. Appl. No. 17/934,218, filed Sep. 22, 2022, as issued by the USPTO Jun. 4, 2024.

*Primary Examiner* — Hai H Huynh
(74) *Attorney, Agent, or Firm* — Frank A. MacKenzie; Brooks Kushman P.C.

(57) ABSTRACT

A vehicle-bumper assembly includes a vehicle bumper and a rod having a first end fixed to the vehicle bumper and a second end spaced from the first end along an elongated axis of the rod. A collar is fixed to the rod between the first end of the rod and the second end of the rod, the collar including a pyrotechnically-activated release releasable from the rod. A spring is retained on the rod between the collar and the vehicle bumper.

18 Claims, 6 Drawing Sheets

(56) References Cited

U.S. PATENT DOCUMENTS

| | | | |
|---|---|---|---|
| 10,875,480 | B2 | 12/2020 | Fichtinger et al. |
| 12,208,758 | B2 | 1/2025 | Farooq et al. |
| 2011/0042975 | A1 | 2/2011 | Faruque |
| 2012/0098280 | A1 | 4/2012 | Handing et al. |
| 2013/0238197 | A1 | 9/2013 | Faruque et al. |
| 2017/0259766 | A1 | 9/2017 | Farooq et al. |
| 2019/0275981 | A1 | 9/2019 | Farooq et al. |
| 2025/0269813 | A1* | 8/2025 | Faruque .................. B60R 19/28 |

FOREIGN PATENT DOCUMENTS

| | | | |
|---|---|---|---|
| DE | 102005021725 | A1 | 11/2006 |
| JP | 2004161109 | A | 6/2004 |

* cited by examiner

RELEASEABLE SPRING-LOADED BUMPER ASSEMBLY

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during certain vehicle-pedestrian impacts.

Some vehicles, such as light duty trucks and sport utility vehicles (SUVs), for example, may have a bumper height that could lead to an uneven impact on the femur and/or tibia of the pedestrian by the vehicle bumper during certain vehicle-pedestrian impacts. For example, light duty trucks may have bumper heights to provide ground clearance to clear speed bumps, curbs, parking blocks, inclined driveway ramps, hills, rough roads, etc. Some vehicles with such bumper heights also have off-road capabilities that preclude having any components below the bumper. As such, a design for the vehicle front-end is investigated for pedestrian leg impact energy management while addressing ground clearance requirements.

DETAILED DESCRIPTION

Figure 1:
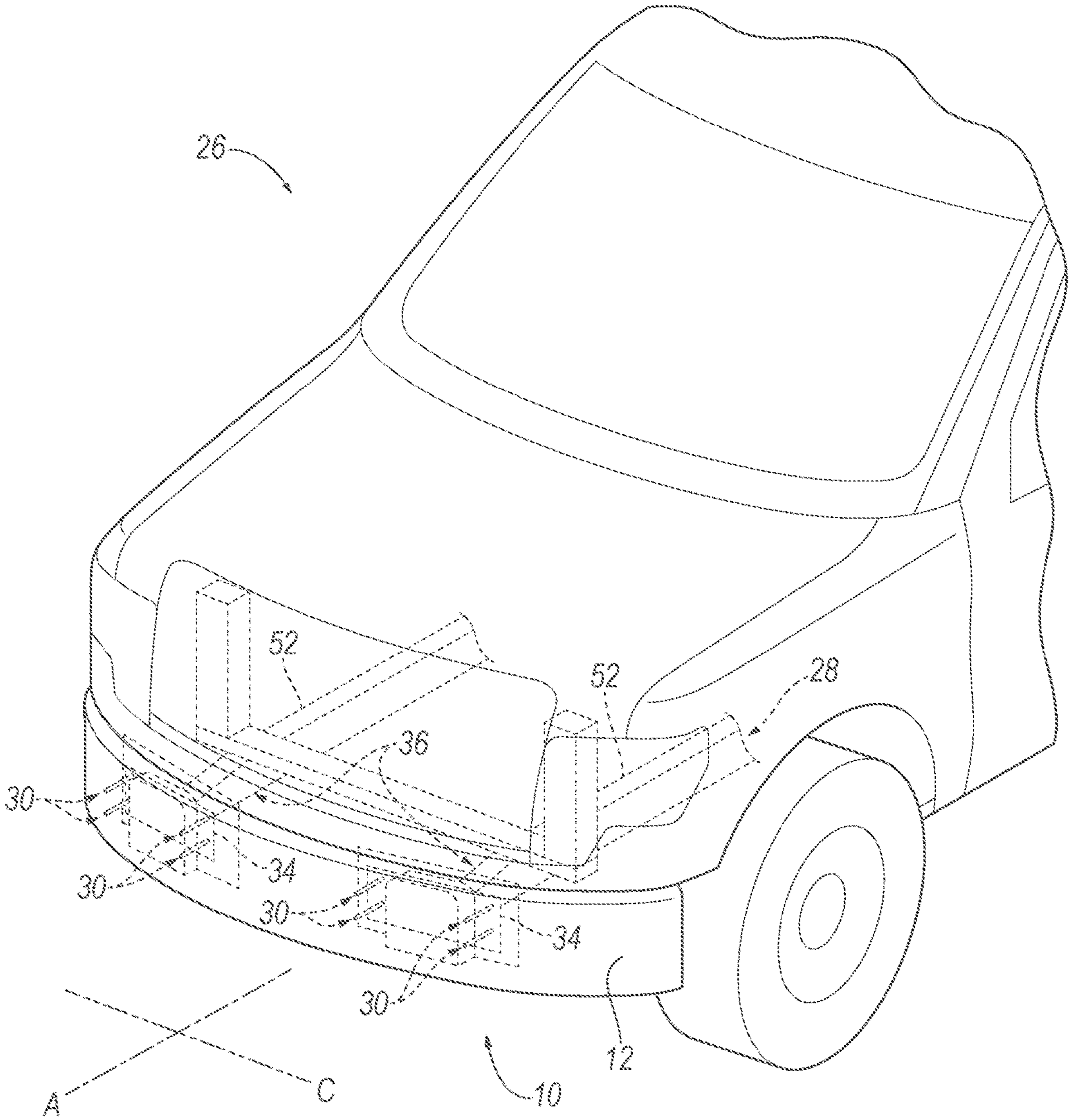
FIG. 1 is a perspective view of a vehicle including a bumper assembly with an energy-absorbing system in broken lines.

A vehicle includes a vehicle frame and a vehicle bumper. A rod is elongated along an axis. The rod is fixed relative to the vehicle bumper and slidably engaged with vehicle frame. A spring is between the vehicle bumper and the vehicle frame. A collar is fixed relative to the rod and extends radially from the rod. The collar includes a pyrotechnically-activated release releasable from the rod.

The collar may be between the vehicle bumper and the vehicle frame.

The collar may be between the spring and the vehicle frame.

The vehicle may include a retainer protruding radially outwardly from the rod, the vehicle frame being between the retainer and the spring. The vehicle frame may include a flange between the retainer and the spring. The flange may include a hole that slidably receives the rod, the retainer having an outer diameter larger than an outer diameter of the hole. The flange may be between the retainer and the collar, and the spring may be between the collar and the vehicle bumper. The retainer and the collar may abut the flange. The vehicle frame may include a crush can, the flange being fixed to the crush can. The wiring may extend from the collar along the crush can.

The vehicle frame may include a hole that slidably receives the rod.

The rod may support the vehicle bumper on the vehicle frame.

The spring may be on the rod.

The rod may include a first portion extending from the vehicle frame to the vehicle bumper, the coil spring having a free length shorter than or equal to than the first portion of the rod.

An assembly includes a vehicle bumper and a rod having a first end fixed to the vehicle bumper and a second end spaced from the first end along an elongated axis of the rod. A collar is fixed to the rod between the first end of the rod and the second end of the rod, the collar including a pyrotechnically-activated release releasable from the rod. A coil spring is retained on the rod between the collar and the vehicle bumper.

The assembly may include a retainer fixable to the second end of the rod, the retainer protruding radially outwardly from rod at second end.

The rod may be configured to extend through a hole in a vehicle frame with the vehicle frame being between the collar and the retainer.

The assembly may include a vehicle frame defining a hole, the rod extending through the vehicle frame with the vehicle frame being between the collar and the retainer.

With reference to the Figures, wherein like numerals indicate like parts throughout the several views, a bumper assembly 10 includes a vehicle bumper 12 and a rod 14 having a first end 16 fixed to the vehicle bumper 12 and a second end 18 spaced from the first end 16 along an elongated axis A of the rod 14. A collar 20 is fixed to the rod 14 between the first end 16 of the rod 14 and the second end 18 of the rod 14. The collar 20 includes a pyrotechnically-activated release 22 releasable from the rod 14. A spring 24 is retained on the rod 14 between the collar 20 and the vehicle bumper 12.

The vehicle 26 includes a vehicle frame 28 and a vehicle bumper 12. The rod 14 is fixed relative to the vehicle bumper 12 and is slidably engaged with vehicle frame 28. The spring 24 is between the vehicle bumper 12 and the vehicle frame 28. The collar 20 is fixed relative to the rod 14 and extends radially from the rod 14. The collar 20 includes a pyrotechnically-activated release 22 releasable from the rod 14.

Figure 6A:
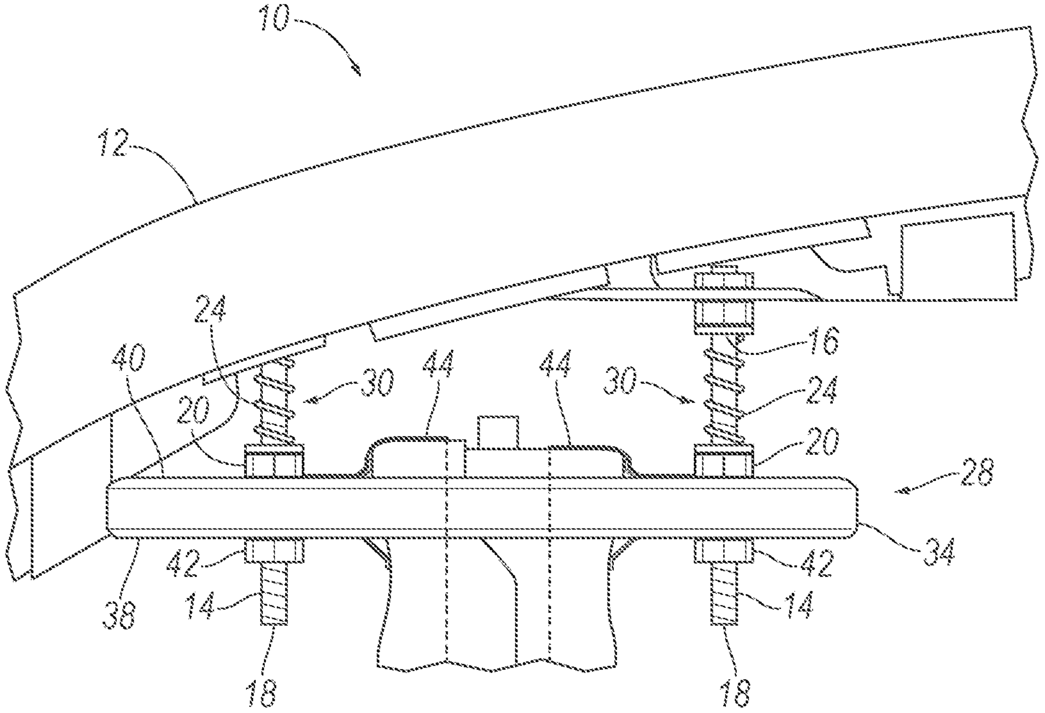
FIG. 6A is a top view of the bumper assembly and frame of the vehicle in a design state.
Figure 6B:
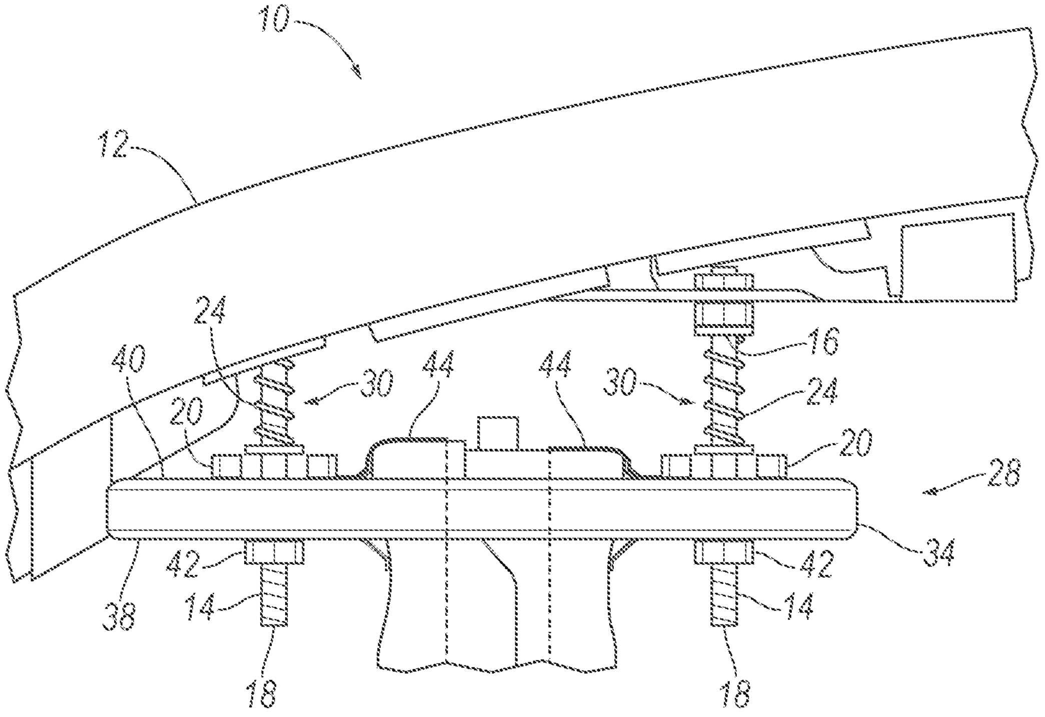
FIG. 6B is the top view of FIG. 6A with the collar released from a rod in a retractable state absent vehicle-impact force on the bumper assembly.
Figure 6C:
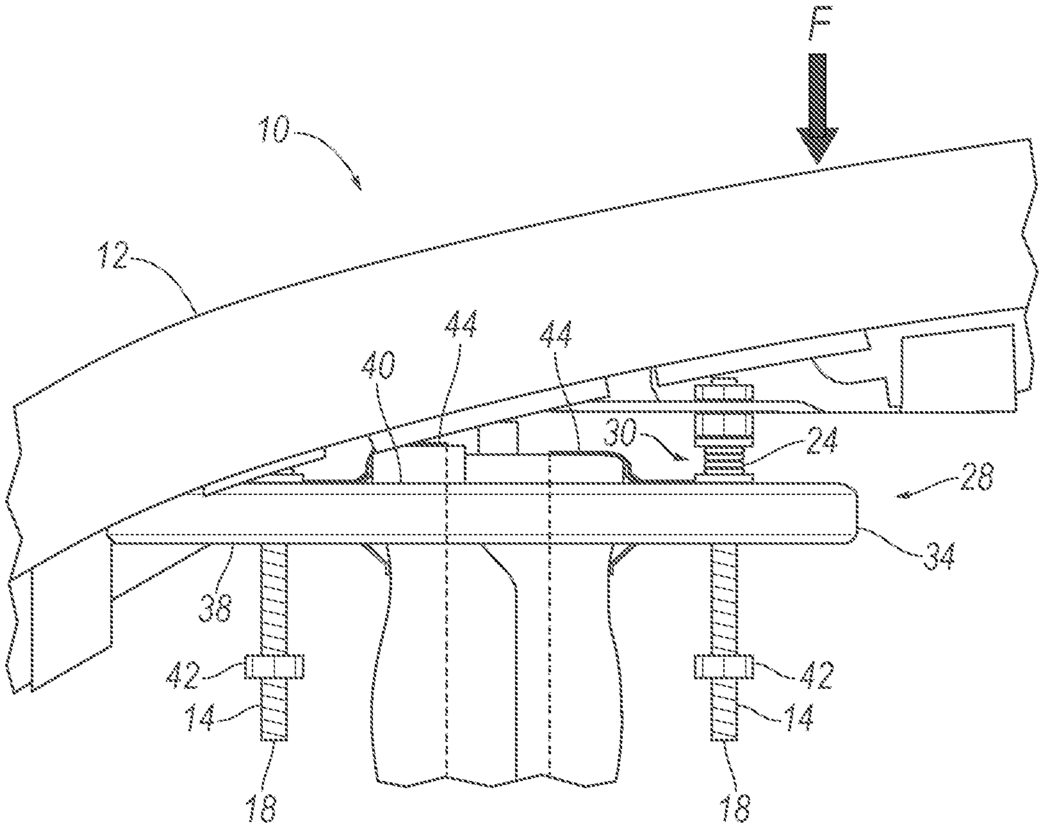
FIG. 6C is the top view of FIG. 6B during certain vehicle impacts.

When the collar 20 is engaged with the rod 14, the collar 20, being fixed to the rod 14, prevents movement of the rod 14 relative to the vehicle frame 28. When the collar 20 is disengaged with the rod 14 by activation of the pyrotechnically-activated release 22, as described below, the rod 14 is free to move relative to the vehicle frame 28 along the axis A of the rod 14. Specifically, in the event of certain vehicle impacts in which the bumper 12 impacts an object, e.g., a crash test leg form as described further below, the pyrotechnically-activated release 22 is activated to release the collar 20 from the rod 14, which allows the bumper 12 to move vehicle rearward relative to the vehicle frame 28 against the force of the spring 24. When the collar 20 is disengaged from the rod 14, force against the bumper 12, e.g., during certain vehicle impacts, of sufficient magnitude to compress the spring 24 will move the bumper 12 and the rod 14 vehicle rearward relative to the vehicle frame 28, as shown in the progression between FIGS. 6A-C. For example, during certain impacts with a leg form, the bumper 12 and rod 14 move vehicle rearward against the force of the spring 24 to absorb energy from the impact and reduce energy delivered from the bumper 12 to the leg form. The spring 24 may provide for gradual absorption of the impact energy during certain vehicle impacts.

As described further below, the bumper assembly 10 includes an energy-absorber assembly 30 between the vehicle frame 28 and the bumper 12. The energy-absorber assembly 30 includes the rod 14, the spring 24, the collar 20, and a retainer 42. The energy-absorber assembly 30 supports the bumper 12 on the vehicle frame 28 and allows the bumper 12 to release from the design state to the retractable state in response to detection of certain vehicle impacts. As set forth below, the bumper assembly 10 may include a plurality of energy-absorber assemblies 30 that, in combination with each other, support the bumper 12 on the vehicle frame 28.

The bumper 12, as an example, may impact the knee of a pedestrian impact test leg form during a standardized test. The leg form may be a flexible pedestrian leg impactor (Flex-PLI) leg form. Example regulations that can use the leg form include Global Technical Regulation (GTR), ECE R127 and Korean Motor Vehicle Safety Standards (KMVSS). Example new car assessment programs that can use the leg form include EuroNCAP, CNCAP, and ANCAP.

The vehicle 26 may be any suitable type of automobile, e.g., a passenger or commercial automobile such as a sedan, a coupe, a truck, a sport utility vehicle, a crossover vehicle, a van, a minivan, a taxi, a bus, etc. The vehicle 26, as an example, may have a relatively high ride height. With reference to FIG. 1, the vehicle 26 defines a vehicle-longitudinal axis extending between a front end (not numbered) and a rear end (not numbered) of the vehicle 26. The vehicle 26 defines a vehicle-lateral axis extending cross-vehicle 26 from one side to the other side of the vehicle 26. The vehicle 26 defines a vertical axis. The vehicle-longitudinal axis, the vehicle-lateral axis, and the vertical axis are perpendicular relative to each other.

With reference to FIG. 1, the vehicle 26 includes the vehicle frame 28 and a vehicle 26 body (not numbered). The vehicle 26 body and the vehicle frame 28 may have a body-on-frame construction (also referred to as a cab-on-frame construction) in which the vehicle 26 body and vehicle frame 28 are separate components, i.e., are modular, and the vehicle 26 body is supported on and affixed to the vehicle frame 28. In the example shown in the Figures, the vehicle 26 has a body-on-frame construction. As another example, the vehicle 26 body and the vehicle frame 28 may be of a unibody construction in which the vehicle frame 28 is unitary with the vehicle 26 body (including frame rails 52, pillars, roof rails, etc.). In other examples, the vehicle frame 28 and vehicle 26 body may have any suitable construction. The vehicle frame 28 and vehicle 26 body may be of any suitable material, for example, steel, aluminum, and/or fiber-reinforced plastic, etc.

The vehicle 26 body includes body panels (not numbered). The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panels, doors, fenders, hood, decklid, etc. The vehicle 26 body may define a passenger cabin to house occupants, if any, of the vehicle 26.

The vehicle frame 28 includes frame rails 52 and may include cross beams. The frame rails 52 are elongated along the vehicle-longitudinal axis. The frame rails 52 are spaced from each other cross-vehicle 26, i.e., along the vehicle-lateral axis. The cross beams of the vehicle frame 28 extend from one frame rail 52 to the other frame rail 52 transverse to the vehicle-longitudinal axis.

With continued reference to FIG. 1, the vehicle frame 28 includes two frame rails 52. The frame rails 52 may define the cross-vehicle 26 boundaries of the vehicle frame 28. The frame rails 52 may be elongated along the vehicle-longitudinal axis A from a rear end of the vehicle 26 to a front end of the vehicle 26. For example, the frame rails 52 may extend along substantially the entire length of the vehicle 26. In other examples, the frame rails 52 may be segmented and extend under portions of the vehicle 26, e.g., at least extending from below a passenger compartment of the vehicle 26 to the front end of the vehicle 26. In some examples, each frame rail 52 may be unitary from the rear end of the vehicle 26 to the front end of the vehicle 26. In other examples, the frame rails 52 may include segments fixed to each other (e.g., by welding, threaded fastener, etc.) and in combination extending from a rear end of the vehicle 26 to the front end of the vehicle 26.

As set forth above, the vehicle frame 28 may have a body-on-frame construction in which the vehicle 26 body is supported on and affixed to the vehicle frame 28. In such an example, the frame rails 52 may include cab mount brackets (not shown) on which the vehicle 26 body is supported and affixed. The cab mount brackets are fixed to the frame rails 52, e.g., welded to the frame rails 52. The cab mount brackets may extend outboard from the frame rail 52. The cab mount bracket may be cantilevered from the frame rail 52. The cab mount brackets are configured to support the vehicle 26 body in a body-on-frame configuration. For example, the cab mount bracket may include a post or a hole that receives a hole or a post, respectively, of the vehicle 26 body to connect the vehicle 26 body to the vehicle frame 28. Specifically, the vehicle 26 body may be fixed to the cab mount bracket. During assembly of the vehicle 26, the vehicle 26 body is set on the vehicle frame 28 with fastening features of the vehicle 26 body aligned with the cab mount brackets for engagement with the cab mount brackets.

The vehicle frame 28 may include suspension and steering attachment points (not shown) that support suspension and steering components of the vehicle 26. As one example, the suspension and steering attachment points may be suspension towers. Suspension and steering components of the vehicle 26 are connected to the vehicle frame 28, at least in part, at the suspension towers. The suspension and steering components include suspension shocks, suspension struts, steering arms, steering knuckles, vehicle wheels, etc.

The frame rails 52 and crossbeams may be extruded, roll-formed, etc. The frame rails 52 and crossbeams of the vehicle frame 28 may be of any suitable material, e.g., suitable types of steel, aluminum, and/or fiber-reinforced plastic, etc. The frame rails 52 and crossbeams may be hollow. The frame rails 52 and crossbeams may be rectangular in cross-section (e.g., a hollow rectangular cuboid), round in cross section, e.g., a hollow, round such as a hollow cylinder), etc.

Figure 2:
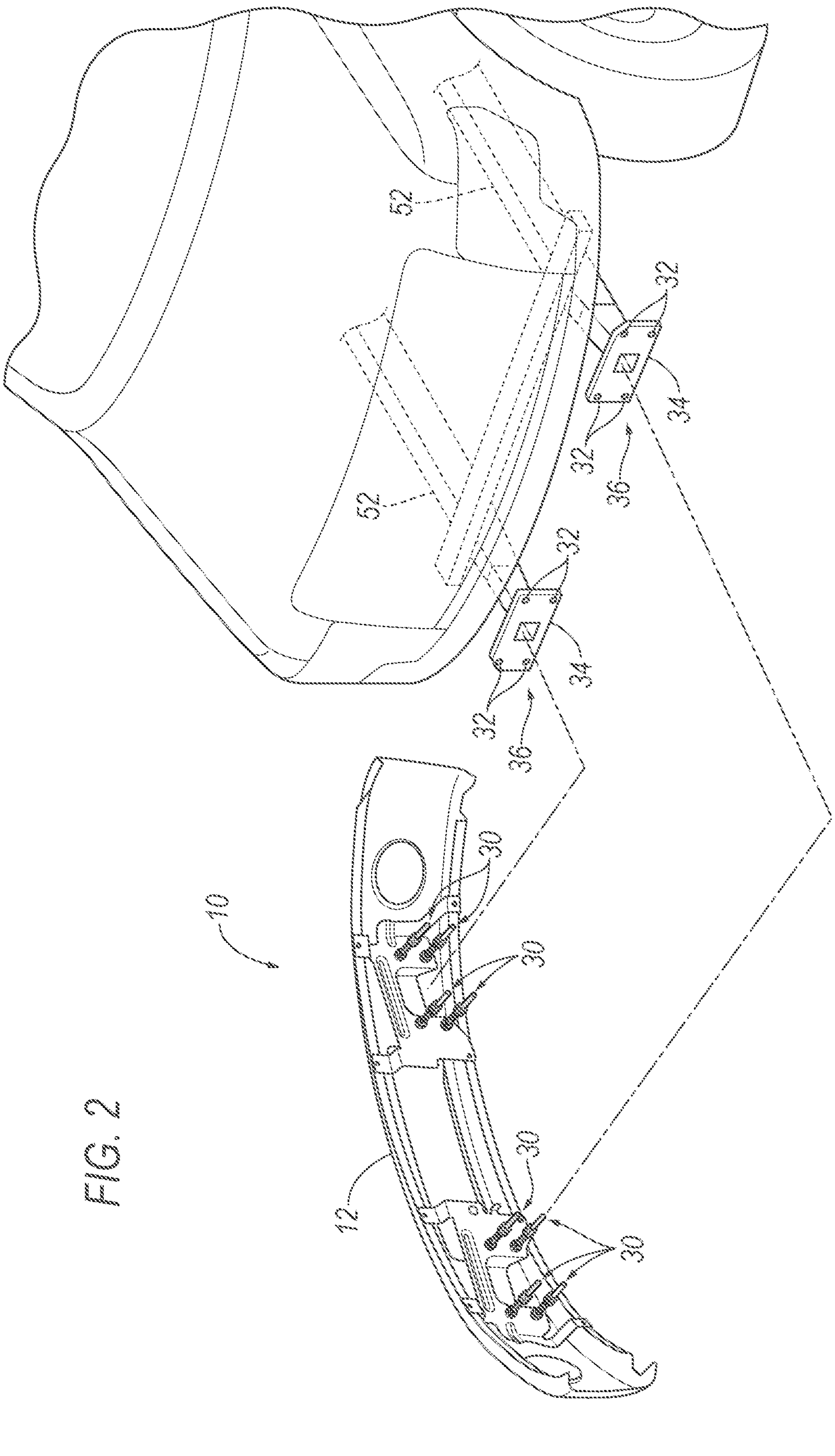
FIG. 2 the perspective view of FIG. 1 with the bumper assembly removed from a frame of the vehicle.
Figure 3:
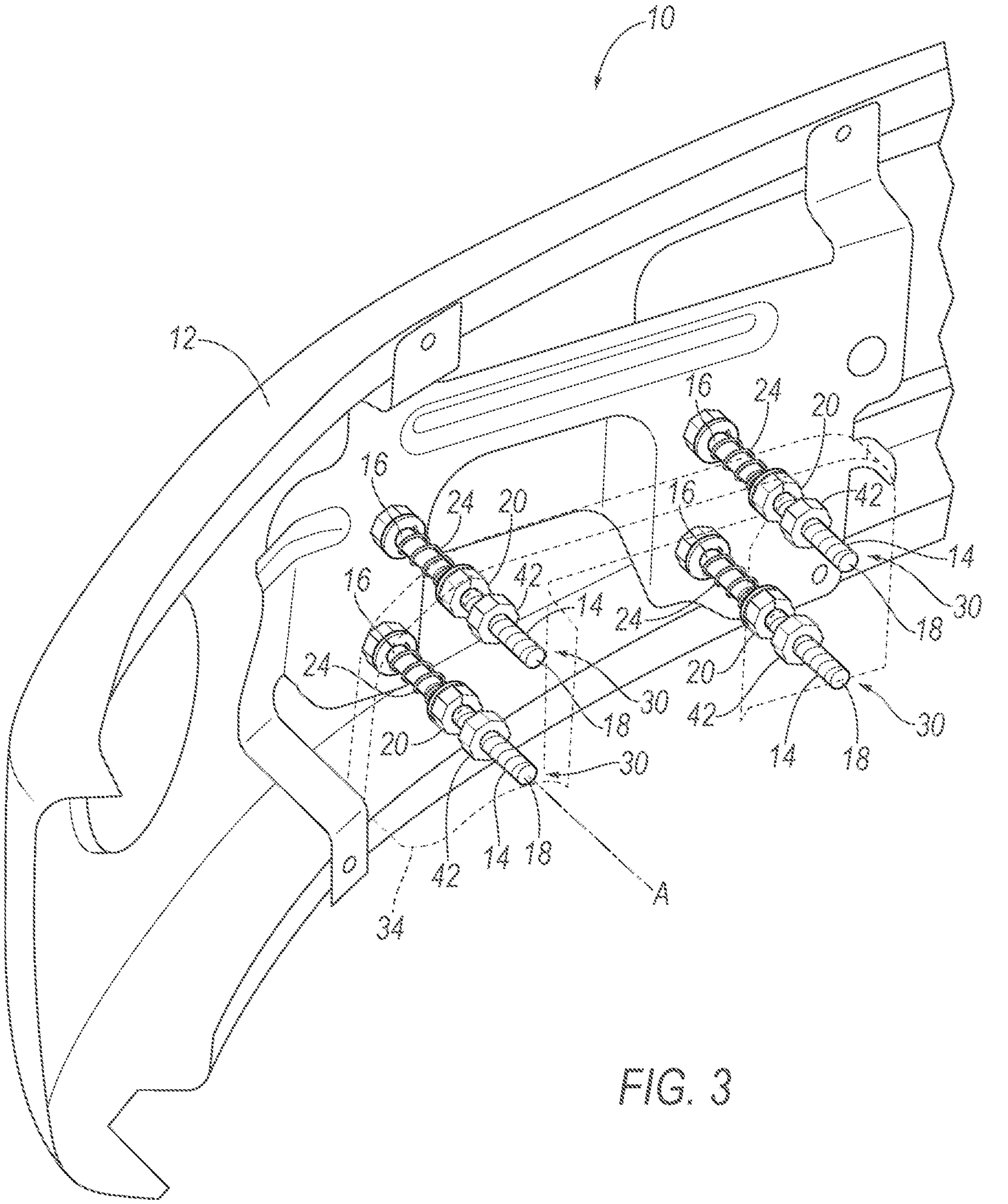
FIG. 3 is a rear view of a portion of the bumper assembly and a portion of the vehicle frame with the bumper assembly exploded from the vehicle frame.
Figure 4:
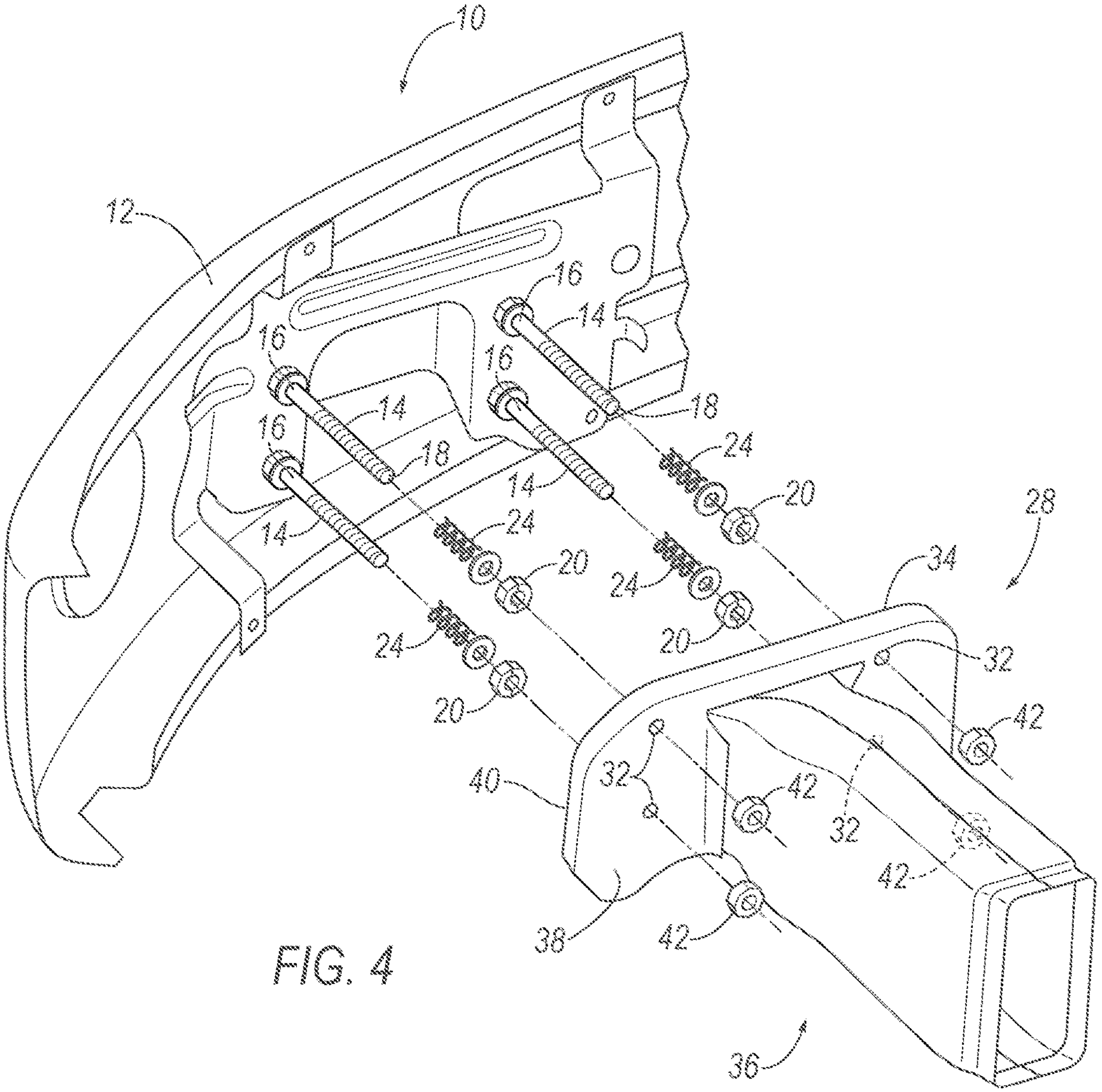
FIG. 4 is an exploded view of the bumper assembly.
Figure 5:
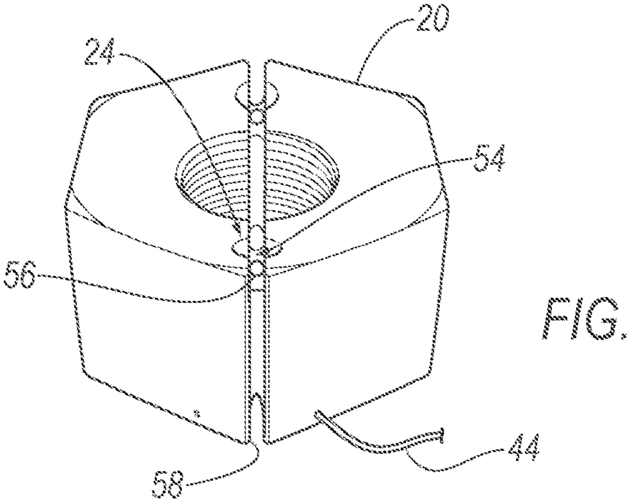
FIG. 5 is a perspective view of a collar of the bumper assembly.

With reference to FIGS. 1 and 2, the vehicle frame 28 includes frame-rail ends 36 extending vehicle-forward of the frame rails 52, respectively. In other words, the vehicle frame 28 includes two frame-rail ends 36 with one frame-rail end 36 extending vehicle-forward of one of the frame rails 52 and the other frame-rail end 36 extending vehicle-forward of the other frame rail 52.

In some examples, including the example shown in the Figures, the frame-rail ends 36 may be of the type referred to in industry as crush cans. In such examples, the frame-rail ends 36 may be designed to deform relative to the frame rail 52 during certain frontal-vehicle impacts. Specifically, the frame-rail ends 36 deform vehicle-rearward to allow rearward movement of the bumper assembly 10 relative to the frame rails 52 to absorb energy during certain vehicle impacts. The frame-rail ends 36 may include features that direct deformation of the frame-rail end 36 toward the frame rail 52 during frontal impact of the bumper 12. These features may include wall geometry, wall thickness, dimples, cutouts, etc.

The frame-rail end 36 is fixed to the respective frame rail 52. For example, the frame-rail end 36 may be fixed to the respective frame rail 52 by welding, fastening, etc. In the example shown in the Figures, the frame-rail end 36 is a component of the vehicle frame 28 that has a body-on-frame architecture, as described above. In other examples, the vehicle frame 28 may be of another architecture, e.g., a unibody architecture. In such examples, the frame rail 52 is a component of the vehicle frame 28 that has a unibody architecture and the frame-rail end 36 is connected to such frame rail 52.

The frame-rail end 36 is elongated along the vehicle-longitudinal axis. For example, the frame-rail end 36 may be coaxial with the frame rail 52 at the connection of the frame-rail end 36 and the frame rail 52. The frame rail 52 has a vehicle-forward end and the frame-rail end 36 extends vehicle-forward from the vehicle-forward end of the frame rail 52. Specifically, the frame-rail end 36 has a vehicle-rearward end at the frame rail 52 and a vehicle-forward end proximate the bumper 12. The frame-rail end 36 may be extruded, roll-formed, etc. The frame-rail end 36 may be of any suitable material, e.g., suitable types of steel, aluminum, and/or fiber-reinforced plastic, etc. The frame-rail end 36 may be hollow. The frame rails 52 and crossbeams may be rectangular in cross-section (e.g., a hollow rectangular cuboid), round in cross section, e.g., a hollow, round such as a hollow cylinder), etc.

With reference to FIG. 1, the vehicle 26 has a front-end structure. The front-end structure includes a grill and the bumper assembly 10. The grill is above the bumper assembly 10. The grill may be a component of the vehicle 26 body and may be supported on other components of the vehicle 26 body.

The bumper 12 extends transversely to the frame rails 52. With reference to FIG. 1, the bumper 12 is elongated along the vehicle-lateral axis. The bumper 12 may be of any suitable material such as metal (steel, aluminum, etc.), fiber-reinforced plastic, etc.

The bumper 12 has a vehicle-forward face 40 and a vehicle-rearward face 38. The vehicle-forward face 40 may be a class-A surface, i.e., a surface specifically manufactured to have a high-quality, finished aesthetic appearance free of blemishes. As an example, the vehicle-forward face 40 may be chromed. The mounting bracket of the bumper assembly 10 is on the vehicle-rearward face 38 of the bumper 12, as shown in the example in the Figures. The mounting bracket is fixed to and moves as a unit with the bumper 12.

In the example shown in the Figures, the bumper assembly 10 includes eight energy-absorber assemblies 30, specifically four energy-absorber assemblies 30 between each frame-rail end 36 and the bumper 12. In other examples, the bumper assembly 10 may include any suitable number of energy-absorber assemblies 30, i.e., one or more. Common numerals are used in the Figures to identify common features among the energy-absorber assemblies 30.

The energy-absorber assembly 30 of the bumper assembly 10 is between the vehicle frame 28 and the bumper 12 and is connected to the vehicle frame 28 and the bumper 12. In the example shown in the Figures, the rod 14 extends from the vehicle frame 28 to the bumper 12. As an example, the vehicle frame 28 includes a hole 32 that slidably receives the rod 14. In the example shown in the Figures, the vehicle frame 28 includes a flange 34 is fixed to the rest of the vehicle frame 28, e.g., the frame-rail end 36 in the example shown in the Figures, and the flange 34 includes the hole 32 that slidably receives the rod 14. In examples in which the frame-rail end 36 is a crush can, the flange 34 is fixed to the crush can. In such examples, the collar 20 is between the flange 34 and the spring 24. In the example shown in the Figures, the collar 20 abuts the flange 34 vehicle-forward of the flange 34 in the design state. The flange 34 includes a vehicle-rearward face 38 and a vehicle-forward face 40, and the collar 20 abuts the vehicle-forward face 40 in the design state in the example shown in the Figures.

The bumper assembly 10 is supported by the vehicle frame 28, i.e., the weight of the bumper assembly 10 is borne by the vehicle frame 28. Specifically, the rod 14 supports the bumper 12 on the vehicle frame 28. In other words, the weight of the bumper 12 is borne by the rod 14 and the weight of the rod 14 and the bumper 12 is borne by the vehicle frame 28 through the connection of the rod 14 to the vehicle frame 28. The bumper assembly 10 may be a front bumper assembly, as shown in the example in the Figures. In other words, the bumper assembly 10 may be at a front of the vehicle 26 and, in such examples, the bumper 12 is operable for certain frontal collisions of the vehicle 26.

In the retractable state, the bumper 12 and the rod 14 are movable along the axis A of the rod 14 relative to the vehicle frame 28 against the force of the spring 24 during certain vehicle impacts. The vehicle frame 28 movably receives the rod 14. For example, as shown in the example in the Figures, the rod 14 slides in the hole 32 axially along the axis A of the rod 14 and the bumper 12 moves relative to the vehicle frame 28 in the retractable state when force on the bumper 12 is sufficient to compress the spring 24. In such examples, the hole 32 is designed, i.e., sized, shaped, and oriented, to allow for movement of the rod 14 along the vehicle-longitudinal axis. In other examples, the vehicle frame 28, e.g., the frame-rail end 36, may include any suitable track, channel, etc., that slidably receives the rod 14 for movement of the rod 14 along the axis A.

The rod 14 is elongated along the axis A of the rod 14. In other words, the longest dimension of the rod 14 is along the axis A. The rod 14 may be, for example, cylindrical, as shown in the example in the Figures. The rod 14 may be, for example, metal or any other suitable material. The rod 14, or the rods 14 in examples including more than one rod 14, has sufficient rigidity to support the bumper 12 on the vehicle frame 28 and sufficient rigidity to transfer linear movement of the bumper 12 relative to the vehicle frame 28 in the retractable state. In the example shown in the Figures, the rods 14, e.g., the eight rods 14, are designed to, in combination, support the bumper 12 on the vehicle frame 28.

The rod 14 is fixable relative to the bumper 12. When the bumper assembly 10 is assembled to the vehicle frame 28, the rod 14 is fixed to the bumper 12. The rod 14 may be fixed to the bumper 12 prior to assembly of the bumper assembly 10 to the vehicle frame 28. The rod 14 may be fixed to the bumper 12 by mechanical attachment that requires removal by a service technician with the use of a tool and/or destruction such as cutting, e.g., cutting material and/or welded joints, etc. In the example shown in the Figures, the rod 14 is threadedly engaged with a weld nut on the bumper 12. The rod 14 may be fixed to the bumper 12, e.g., the weld nut, with additional features such as welding, pinning, a counter-nut, etc.

The rod 14 is slidably engaged with the vehicle frame 28. In the example shown in the Figures, the hole 32 and the rod 14 are sized and shaped so that the rod 14 is free to slide vehicle forward and vehicle rearward along the axis A when forces act axially on the rod 14. The rod 14 is moveable axially relative to the vehicle frame 28 vehicle-rearward toward the vehicle frame 28 when the collar 20 is disengaged with the rod 14 and force is applied to the bumper 12 sufficient to compress the spring 24. After compression of the spring 24, in the event the force on the bumper 12 decreases to a level at which the spring 24 resiliently decompresses, the spring 24 expands and moves the bumper 12 vehicle-forward away from the vehicle frame 28, during which movement the rod 14 moves axially relative to the vehicle frame 28.

As set forth above, the rod 14 has a first end 16 and a second end 18 spaced from the first end 16 along the axis A of the rod 14. The first end 16 is fixable to the vehicle bumper 12. In the example shown in the Figures, the rod 14 includes threads at the first end 16 and the vehicle bumper 12 includes a threaded hole 32, e.g., in a weld nut, designed to threadedly receive the threads of the rod 14.

When the bumper assembly 10 is assembled to the vehicle frame 28 in the design state, a first portion of the rod 14 extends from the collar 20 to the bumper 12, e.g., the weld nut. For example, the first portion of the rod 14 terminates at the collar 20 and at the bumper 12 when the bumper assembly 10 is in the design state. The second end 18 of the rod 14 is retained to the vehicle frame 28 by the collar 20 in the design state and by the retainer 42 in the retractable state.

The collar 20 is between the vehicle bumper 12 and the vehicle frame 28. The collar 20 is between the spring 24 and the vehicle frame 28, and the spring 24 is between the collar 20 and the vehicle bumper 12. In some examples, including the example shown in the Figures, a washer (not numbered) may be between the spring 24 and the collar 20. The vehicle frame 28, e.g., the flange 34, is between the retainer 42 and the spring 24.

The collar 20 and the retainer 42 limit axial movement of the rod 14 when the collar 20 is engaged with the rod 14 in the design state. The collar 20, being vehicle-forward of the flange 34, prevents vehicle-rearward movement of the rod 14 relative to the vehicle frame 28. The retainer 42, being vehicle rearward of the flange 34, prevents vehicle-forward movement of the rod 14 relative to the vehicle frame 28. In the example shown in the Figures, the collar 20 abuts the vehicle-forward face 40 of the flange 34 and the retainer 42 abuts the vehicle-rearward face 38 of the flange 34.

The collar 20 is fixed relative to the rod 14 when the bumper assembly 10 is in the design state. In the example shown in the Figures, the collar 20 is connected directly to the rod 14 between the first end 16 of the rod 14 and the second end 18 of the rod 14. The collar 20 is fixed to the rod 14 in that the collar 20 is immovable axially along the rod 14 absent intentional release of the collar 20, e.g., destruction by activation of the pyrotechnically-activated release 22, or by removal by a service technician with the use of a tool and/or destruction such as cutting, e.g., cutting material and/or welded joints, etc., by the service technician. In the example shown in the Figures, the rod 14 has external threads and the collar 20 has internal threads threadedly engaged with the external threads of the rod 14 to axially fix the collar 20 relative to the rod 14. In such an example, additional engagement may be achieved by adhesive, bond, welding, etc., at the threads. In other examples, the collar 20 may be fixed to the rod 14 in any suitable fashion including one or a combination of threads, pinning, engagement of grooves, adhesive, bonding, welding, etc.

The collar 20 extends radially from the rod 14. In the example shown in the Figures, the collar 20 has the shape of a threaded nut. In such an example, the collar 20 extends endlessly around the circumference of the rod 14. In other examples, the collar 20 may extend along less than the entire circumference of the rod 14. The collar 20 is larger than the hole 32 such that the collar 20 abuts the vehicle frame 28, e.g., the flange 34, to maintain the position of the rod 14 relative to the vehicle frame 28 in the design state. The collar 20 has an outer dimension, i.e., taken radially outward from the rod 14, that is larger than the outer dimension of the hole 32 such that the collar 20 abuts the vehicle frame 28 in the design state to maintain the rod 14 and the bumper 12 in the design state.

The collar 20 is releasable from the rod 14 and, when the collar 20 is released from the rod 14, the energy-absorber assembly 30 changes from the design state to the retractable state. As set forth above, the collar 20 is fixed to the rod 14 absent intentional release and the collar 20 is releasable from the rod 14 and thus is releasably fixed to the rod 14.

The collar 20 may include a pyrotechnically-activated release 22 releasable from the rod 14. The pyrotechnically-activated release 22 includes a pyrotechnic charge 56 that releases the collar 20 from the rod 14 when activated. The activation of the pyrotechnically-activated release 22 releases the collar 20 from the rod 14 by destroying at least the connection between the collar 20 and the rod 14. The collar 20 may be a pyrotechnic fastener, and more specifically a pyrotechnic-separation nut. In some instances of such examples the pyrotechnic fastener, e.g., the pyrotechnic-separation nut, may be of a type known in the art. As one example, the pyrotechnically-activated release 22 includes a pocket 54 that receives the pyrotechnic charge 56 so that activation of the pyrotechnic charge 56 breaks the collar 20 to release the collar 20 from the rod 14. The pyrotechnically-activated release 22 may include a seam 58 in the collar 20 at or near the pyrotechnic charge 56. The seam 58 may be a weakened area at which separation is encouraged during activation of the pyrotechnic charge 56.

The pyrotechnic charge 56 may be combustible to produce a gas. The pyrotechnic charge 56 may be a solid mixture of substances that, when ignited, react to produce the gas. For example, the pyrotechnic charge 56 may be sodium azide ($NaNO3$), potassium nitrate ($KNO3$), and silicon dioxide ($SiO2$), which react to form nitrogen gas ($N2$).

The vehicle 26 may include a communication cable 44 connecting the pyrotechnically-activated release 22 to a control module that controls activation of the pyrotechnically-activated release 22. In the example shown in the Figures, the communication cable 44 extends along the frame-rail end 36, e.g., the crush can, along the flange 34 to the pyrotechnically-activated release 22. The control module commands activation of the pyrotechnically-activated release 22 through the communication cable 44. The communication cable 44, for example, may include an electric wire through which an electrical impulse may be transmitted to the pyrotechnically-activated release 22 to activate the pyrotechnically-activated release 22.

The spring 24 is operatively engaged with the vehicle frame 28 and the bumper 12 to exert force the bumper 12 vehicle-forward away from the vehicle frame 28 along the axis A. In the example shown in the Figures, the spring 24 abuts the bumper 12 and abuts the collar 20 in the design state. In the retractable state, the spring 24 abuts the bumper 12 and abuts the vehicle frame 28, specifically the flange 34. In some examples, the spring 24 may be relaxed in the design state. In such examples, the coil spring 24 has a free length shorter than or equal to than the first portion of the rod 14. In other examples, the spring 24 may be compressed along the axis A of the rod 14 between the vehicle bumper 12 and the vehicle frame 28 in the design state.

In the retractable state, the spring 24 may be compressed between the bumper 12 and the vehicle frame 28 as the bumper 12 moves vehicle-rearward relative to the vehicle frame 28 after release of the collar 20 based on certain vehicle impacts. In such instances, the spring 24 is compressed as the bumper 12 moves vehicle-rearward toward the vehicle frame 28. When in the design state, the collar 20 may be released from the rod 14 based on pre-impact detection of certain vehicle impacts, as described further below.

The spring 24, as an example, may be a coil spring 24. In the example shown in the Figures, the spring 24 is a coil spring 24 on the rod 14 between the bumper 12 and the vehicle frame 28, i.e., the coils of the coil spring 24 helically extend around the rod 14 along the axis A. In such an example, the spring 24 has an inner diameter sized to be received by the rod 14. The inner diameter of the spring 24 is larger than the outer diameter of the rod 14. The spring 24 may be metal.

In the example shown in the Figures, the bumper assembly 10, specifically the energy-absorber assembly 30, includes the retainer 42 fixed to the rod 14 to retain the rod 14 to the vehicle frame 28, e.g., in the hole 32, in both the design state and the retractable state. The flange 34 is between the collar 20 and the retainer 42. The retainer 42 is spaced from the collar 20 along the axis A with the flange 34 therebetween.

The retainer 42 is sized to retain the rod 14 in the hole 32. The retainer 42 protrudes radially outwardly from rod 14, e.g., at second end 18. The retainer 42 has an outer dimension, i.e., taken radially outward from the rod 14, that is larger than the outer dimension of the hole 32 such that the retainer 42 abuts the vehicle frame 28 in the design state and the retractable state.

The retainer 42 is fixable to the rod 14, e.g., the second end 18 of the rod 14. Specifically, when assembled in the design state, the retainer 42 is fixed to the rod 14. The retainer 42 is fixed to the rod 14 along the axis A of the rod 14, e.g., by threaded engagement, adhesive, welding, unitary formation, etc. The retainer 42 may be fixed to the distal end of the rod 14.

In the example shown in the Figures, the rod 14 has external threads and the retainer 42 has internal threads threadedly engaged with the external threads of the rod 14 to axially fix the collar 20 relative to the rod 14. In such an example, additional engagement may be achieved by adhesive, bond, welding, etc., at the threads. In other examples, the retainer 42 may be fixed to the rod 14 in any suitable fashion including one or a combination of threads, pinning, engagement of grooves, adhesive, bonding, welding, etc. In the example shown in the Figures, the retainer 42 is a threaded nut that engages the same external threads in the rod 14 that the collar 20 engages.

Figure 7:
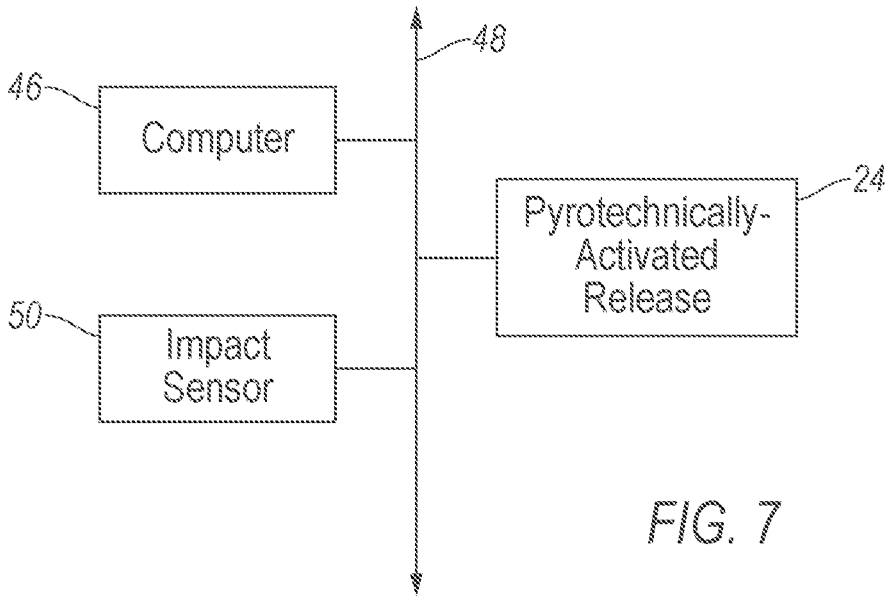
FIG. 7 is a schematic of a system of the vehicle.

With reference to FIG. 7, the vehicle 26 includes the vehicle computer 46 including a processor and a memory. The computer 46 may be a body control module. The memory includes one or more forms of computer 46 readable media, and stores instructions executable by the computer 46 for performing various operations, including as disclosed herein and including, for example, the process described below. For example, the computer 46 may be a generic computer 46 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 46 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 46. The memory may be of any type, e.g., hard disk drives, solid state drives, servers, or any volatile or non-volatile media. The memory may store the collected data sent from the sensors. The memory may be a separate device from the computer 46, and the computer 46 may retrieve information stored by the memory via a vehicle communication network 48, e.g., over a CAN bus, a wireless network, etc. Alternatively or additionally, the memory may be part of the computer 46, e.g., as a memory of the computer 46.

As shown in FIG. 7, the computer 46 is generally arranged for communications on the vehicle communication network 48 that may include a bus in the vehicle 26 such as a controller area network CAN or the like, and/or other wired and/or wireless mechanisms. Alternatively or additionally, in cases where the computer 46 includes a plurality of devices, the vehicle communication network 48 may be used for communications between devices represented as the computer 46 in this disclosure. Further, as mentioned below, various controllers and/or sensors may provide data to the computer 46 via the vehicle communication network 48.

The vehicle 26 may include at least one impact sensor 50 for sensing certain vehicle impacts (e.g., impacts of a certain magnitude, direction, etc.), and the computer 46 in communication with the impact sensor 50 and the pyrotechnically-activated release 22. The computer 46 may activate the pyrotechnically-activated release 22, e.g., provide an impulse to the pyrotechnic charge 56 of the pyrotechnically-activated release 22 when the impact sensor 50 senses certain vehicle impacts. The impact sensor 50 may be configured to sense certain vehicle impacts prior to impact, i.e., pre-impact sensing. The impact sensor 50 may be in communication with the computer 46. The impact sensor 50 is configured to detect certain vehicle impacts. In other words, a "certain vehicle impact" is an impact of the type and/or magnitude for which inflation of the airbag is designed i.e., "certain" indicates the type and/or magnitude of the impact. The type and/or magnitude of such "certain vehicle impacts" may be pre-stored in the computer 46, e.g., a restraints control module and/or a body control module. The impact sensor 50 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 50 may be located at numerous points in or on the vehicle 26.

The computer 46 stores instructions to control components of the vehicle 26 according to the process described below. Use of "in response to," "based on," and "upon determining" herein indicates a causal relationship, not merely a temporal relationship. The computer 46 stores instructions to, in response to detection of certain vehicle impacts (e.g., pre-impact detection of a certain imminent impacts), command activation of the pyrotechnically-activated release 22. Specifically, the computer 46 commands an electrical impulse to the pyrotechnic charge 56 to release the collar 20 from the rod 14, as described above. In examples including more than one pyrotechnically-activated release 22, the computer 46 may simultaneously command activation of each pyrotechnically-activated release 22. When the collars 20 release the rods 14, the energy-absorbing assemblies are in the retractable state such that the springs 24 can compress to during impact with the vehicle bumper 12, as described above. In examples in which the release of the collars 20 from the rods 14 is based on pre-impact detection, the certain vehicle impacts are detected before impact and the collars 20 are released from the rods 14 prior to impact. In such examples, during certain vehicle impacts of sufficient magnitude to compress the spring 24, the impact can move the bumper 12 and the rods 14 vehicle rearward relative to the vehicle frame 28. For example, during certain impacts with a leg form, the bumper 12 and rods 14 move vehicle rearward against the force of the springs 24 to absorb energy from the impact and reduce energy delivered from the bumper 12 to the leg form, as described above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:

a vehicle frame;

a vehicle bumper;

a rod elongated along an axis, the rod being fixed relative to the vehicle bumper and slidably engaged with the vehicle frame;

a spring between the vehicle bumper and the vehicle frame; and a collar fixed relative to the rod and extending radially from the rod, the collar including a pyrotechnically-activated release releasable from the rod.

2. The vehicle of claim 1, wherein the collar is between the vehicle bumper and the vehicle frame.

3. The vehicle of claim 1, wherein the collar is between the spring and the vehicle frame.

4. The vehicle of claim 1, further comprising a retainer protruding radially outwardly from the rod, the vehicle frame being between the retainer and the spring.

5. The vehicle of claim 4, wherein the vehicle frame includes a flange between the retainer and the spring.

6. The vehicle of claim 5, wherein the flange includes a hole that slidably receives the rod, the retainer having an outer diameter larger than an outer diameter of the hole.

7. The vehicle of claim 5, wherein the flange is between the retainer and the collar, and the spring is between the collar and the vehicle bumper.

8. The vehicle of claim 5, wherein the retainer and the collar abut the flange.

9. The vehicle of claim 5, wherein the vehicle frame includes a crush can, the flange being fixed to the crush can.

10. The vehicle of claim 9, wherein the wiring extends from the collar along the crush can.

11. The vehicle of claim 1, wherein the vehicle frame includes a hole that slidably receives the rod.

12. The vehicle of claim 1, wherein the rod supports the vehicle bumper on the vehicle frame.

13. The vehicle of claim 1, wherein the spring is on the rod.

14. The vehicle of claim 1, wherein the rod includes a first portion extending from the vehicle frame to the vehicle bumper, the spring having a free length shorter than or equal to the first portion of the rod.

15. An assembly comprising:

a vehicle bumper;

a rod having a first end fixed to the vehicle bumper and a second end spaced from the first end along an elongated axis of the rod;

a collar fixed to the rod between the first end of the rod and the second end of the rod, the collar including a pyrotechnically-activated release releasable from the rod; and a coil spring retained on the rod between the collar and the vehicle bumper.

16. The assembly of claim 15, further comprising a retainer fixable to the second end of the rod, the retainer protruding radially outwardly from the rod at the second end.

17. The assembly of claim 16, wherein the rod is configured to extend through a hole in a vehicle frame with the vehicle frame being between the collar and the retainer.

18. The assembly of claim 16, further comprising a vehicle frame defining a hole, the rod extending through the vehicle frame with the vehicle frame being between the collar and the retainer.

* * * * *